(12) United States Patent
Masias et al.

(10) Patent No.: US 9,760,097 B2
(45) Date of Patent: Sep. 12, 2017

(54) ADJUSTABLE DEADBAND CONTROL SYSTEM

(71) Applicant: EMERSON PROCESS MANAGEMENT REGULATOR TECHNOLOGIES, INC., McKinney, TX (US)

(72) Inventors: Justin Lane Masias, McKinney, TX (US); Douglas James Scheffler, McKinney, TX (US); Tung K. Nguyen, McKinney, TX (US); James Curtis Bagby, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 127 days.

(21) Appl. No.: 14/825,454

(22) Filed: Aug. 13, 2015

(65) Prior Publication Data

US 2016/0356389 A1 Dec. 8, 2016

Related U.S. Application Data

(60) Provisional application No. 62/170,453, filed on Jun. 3, 2015.

(51) Int. Cl.
*F16K 17/10* (2006.01)
*G05D 16/16* (2006.01)
(Continued)

(52) U.S. Cl.
CPC ............ *G05D 16/163* (2013.01); *F16K 1/523* (2013.01); *F16K 17/02* (2013.01); *F16K 17/10* (2013.01); *G05D 16/16* (2013.01); *F16K 1/526* (2013.01)

(58) Field of Classification Search
CPC .......... F16K 1/523; F16K 1/526; F16K 17/02; F16K 17/10; G05D 16/16; G05D 16/163;
(Continued)

(56) References Cited

U.S. PATENT DOCUMENTS 1,110,320 A * 9/1914 Fulton ..................... F16K 17/10
137/488
1,189,349 A * 7/1916 Cross ..................... F16K 17/10
137/488

(Continued)

OTHER PUBLICATIONS

International Search Report and Written Opinion for PCT/US16/35625 dated Aug. 31, 2016.
(Continued)

*Primary Examiner* — William McCalister
*Assistant Examiner* — Richard K Durden
(74) *Attorney, Agent, or Firm* — Marshall, Gerstein & Borun LLP

(57) ABSTRACT

Control systems include various combinations of pressure regulators, pilots, and pressure stabilizers to provide systems with adjustable deadbands for over pressure protection, adjustable deadbands for under pressure protection, adjustable deadbands for both over pressure and under pressure protection, pressure assisted closure for over pressure protection, pressure assisted closure for under pressure protection, pressure assisted closure for both over pressure and under pressure protection, or spring assisted closure for over pressure and under pressure protection.

4 Claims, 5 Drawing Sheets

(51) Int. Cl.
*F16K 17/02* (2006.01)
*F16K 1/52* (2006.01)

(58) Field of Classification Search
CPC ............ G05D 16/166; Y10T 137/7762; Y10T 137/7764; Y10T 137/7768; Y10T 137/7769; Y10T 137/777
See application file for complete search history.

(56) References Cited

U.S. PATENT DOCUMENTS

| | | | | |
|---|---|---|---|---|
| 2,543,846 | A * | 3/1951 | Griswold | F16K 17/105 137/488 |
| 3,977,423 | A | 8/1976 | Clayton | |
| 4,090,526 | A * | 5/1978 | Witt | B67C 3/12 137/209 |
| 4,250,913 | A * | 2/1981 | Scull | F16K 31/385 137/116.5 |
| 5,348,036 | A * | 9/1994 | Oksanen | G05D 7/03 137/1 |
| 9,086,702 | B2 * | 7/2015 | Griffin, Jr. | G05D 16/185 |
| 2008/0023662 | A1 * | 1/2008 | Reinicke | F16K 15/183 251/58 |
| 2008/0251130 | A1 * | 10/2008 | Folk | F16K 31/365 137/14 |
| 2008/0251146 | A1 * | 10/2008 | Folk | F16K 31/365 137/624.27 |
| 2010/0071787 | A1 | 3/2010 | Folk et al. | |
| 2013/0092259 | A1 * | 4/2013 | Griffin, Jr. | F15B 11/08 137/487.5 |
| 2014/0182694 | A1 | 7/2014 | Cheron et al. | |
| 2015/0114492 | A1 | 4/2015 | Oksanen et al. | |

OTHER PUBLICATIONS http://www.epta.com.ar, Pneumatic Relays product series, Aug. 2015.

* cited by examiner

ADJUSTABLE DEADBAND CONTROL SYSTEM

CROSS-REFERENCE TO RELATED APPLICATIONS

This application claims priority to U.S. Provisional Patent Application No. 62/170,453, entitled "Adjustable Deadband Control System" and filed Jun. 3, 2015, the entire disclosure of which is hereby incorporated by reference herein.

FIELD OF THE DISCLOSURE

This disclosure relates generally to fluid control systems and, more particularly, to control systems that provide over pressure and/or under pressure protection.

BACKGROUND

The pressure at which typical fluid distribution systems supply fluid may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, fluid regulators are implemented in these distribution systems in order to ensure that the delivered gas meets the requirements of the end-user facilities.

Fluid distribution systems can include a control system that has as a slam-shut device, which can operate based on a maximum downstream pressure, a minimum downstream pressure, or maximum and minimum downstream pressure. When the downstream pressure is at a normal operating value, the slam-shut device remains open. When downstream pressure varies beyond its set limits, the slam-shut device closes and prevents fluid from flowing through the fluid regulator. During an over pressure or under pressure situation of a downstream pipeline pressure, the slam-shut device is used as a secondary or tertiary protection device. However, in most applications, the slam-shut device has to be manually reset.

Current applications of non-venting over pressure protection utilize a monitor regulator or a slam shut. A monitor regulator is a normal pressure reducing regulator used in series with another pressure reducing regulator, the worker. If the worker regulator malfunctions and control pressure increases then the monitor takes over and maintains the control pressure at a slightly higher set point. Slam shuts are also used in series with the worker. If the control pressure climbs too high the slam shut will close cutting off all supply to the worker. A manual reset of the slam shut is required to reenergize the system.

Some applications want the functionality of both a monitor and a slam shut. When control pressure climbs too high the supply needs to be cut off but when the pressure drops to a safe level the device reopens.

BRIEF SUMMARY OF THE DISCLOSURE

In accordance with a first exemplary aspect of the present invention, a control system comprises a pressure regulator, a first pilot, a second pilot, and a pressure stabilizer. The pressure regulator comprises a fluid inlet, a fluid outlet, and an actuator assembly. The first and second pilots are in fluid communication with the actuator assembly and the fluid outlet. The pressure stabilizer is in fluid communication with the fluid inlet, the fluid outlet, and the first pilot.

In further accordance with the first foregoing exemplary aspect of the present invention, a control system may further include, in any combination, any one or more of the following preferred forms.

In one preferred form, the first pilot is in an open position and the second pilot is in a closed position with a pressure of a process fluid at the fluid outlet below a first setpoint of the first pilot and below a second setpoint of the second pilot, the first pilot is in a closed position and the second pilot is in the closed position with the pressure of the process fluid at the outlet above the first setpoint and below the second setpoint, and the first pilot is in a closed position and the second pilot is in an open position with the pressure of the process fluid at the fluid outlet above the first setpoint and above the second setpoint.

In accordance with a second exemplary aspect of the present invention, a control system comprises a pressure regulator, a first pilot, a second pilot, and a pressure stabilizer. The pressure regulator comprises a fluid inlet, a fluid outlet, and an actuator assembly. The first and second pilots are in fluid communication with the actuator assembly and the fluid outlet. The pressure stabilizer is in fluid communication with the fluid inlet, the fluid outlet, and the second pilot.

In further accordance with the second foregoing exemplary aspect of the present invention, a control system may further include, in any combination, any one or more of the following preferred forms.

In one preferred form, the first pilot is in a closed position and the second pilot is in an open position with a pressure of a process fluid at the fluid outlet above a first setpoint of the first pilot and above a second setpoint of the second pilot, the first pilot is in the closed position and the second pilot is in a closed position with the pressure of the process fluid at the outlet below the second setpoint and above the first setpoint, and the first pilot is in an open position and the second pilot is in the closed position with the pressure of the process fluid at the fluid outlet below the first setpoint and below the second setpoint.

In accordance with a third exemplary aspect of the present invention, a control system comprises a pressure regulator, a first pilot, a second pilot, and a pressure stabilizer. The pressure regulator comprises a fluid inlet, a fluid outlet, and an actuator assembly. The first and second pilots are in fluid communication with the actuator assembly and the fluid outlet. The pressure stabilizer is in fluid communication with the fluid inlet, the fluid outlet, the first pilot, and the second pilot.

In further accordance with the third foregoing exemplary aspect of the present invention, a control system may further include, in any combination, any one or more of the following preferred forms.

In one preferred form, the first pilot is in an open position and the second pilot is in a closed position with a pressure of a process fluid at the fluid outlet below a first setpoint of the first pilot and below a second setpoint of the second pilot, the first pilot is in a closed position and the second pilot is in the closed position with the pressure of the process fluid at the outlet above the first setpoint and below the second setpoint, and the first pilot is in a closed position and the second pilot is in an open position with the pressure of the process fluid at the fluid outlet above the first setpoint and above the second setpoint.

In another preferred form, the first pilot is in a closed position and the second pilot is in an open position with a pressure of a process fluid at the fluid outlet above a first setpoint of the first pilot and above a second setpoint of the second pilot, the first pilot is in the closed position and the second pilot is in a closed position with the pressure of the process fluid at the outlet below the second setpoint and above the first setpoint, and the first pilot is in an open position and the second pilot is in the closed position with the pressure of the process fluid at the fluid outlet below the first setpoint and below the second setpoint.

In accordance with a fourth exemplary aspect of the present invention, a control system comprises a pressure regulator, a first pilot, a second pilot, and a pressure stabilizer. The pressure regulator comprises a fluid inlet, a fluid outlet, and an actuator assembly. The first pilot is in fluid communication with the actuator assembly and the fluid outlet. The second pilot is in fluid communication with the first pilot and the fluid outlet. The pressure stabilizer is in fluid communication with the fluid inlet, the fluid outlet, and the second pilot.

In further accordance with the fourth foregoing exemplary aspect of the present invention, a control system may further include, in any combination, any one or more of the following preferred forms.

In one preferred form, the first pilot is in an open position and the second pilot is in a closed position with a pressure of a process fluid at the fluid outlet below a first setpoint of the first pilot and below a second setpoint of the second pilot, the first pilot is in the open position and the second pilot is in an open position with the pressure of the process fluid at the outlet above the second setpoint and below the first setpoint, and the first pilot is in a closed position and the second pilot is in the open position with the pressure of the process fluid at the fluid outlet above the first setpoint and above the second setpoint.

DETAILED DESCRIPTION

The control systems shown herein allow the pressure regulator to limit pressure downstream while also letting the downstream pressure decay to a preset lower limit. The control systems have the quick shutting advantages of a slamshut bubble tight system and can automatically reset to normal operating conditions without manual manipulation. Some of the control systems shown herein can also create a pilot deadband that is adjustable for different setpoints.

Figure 1:
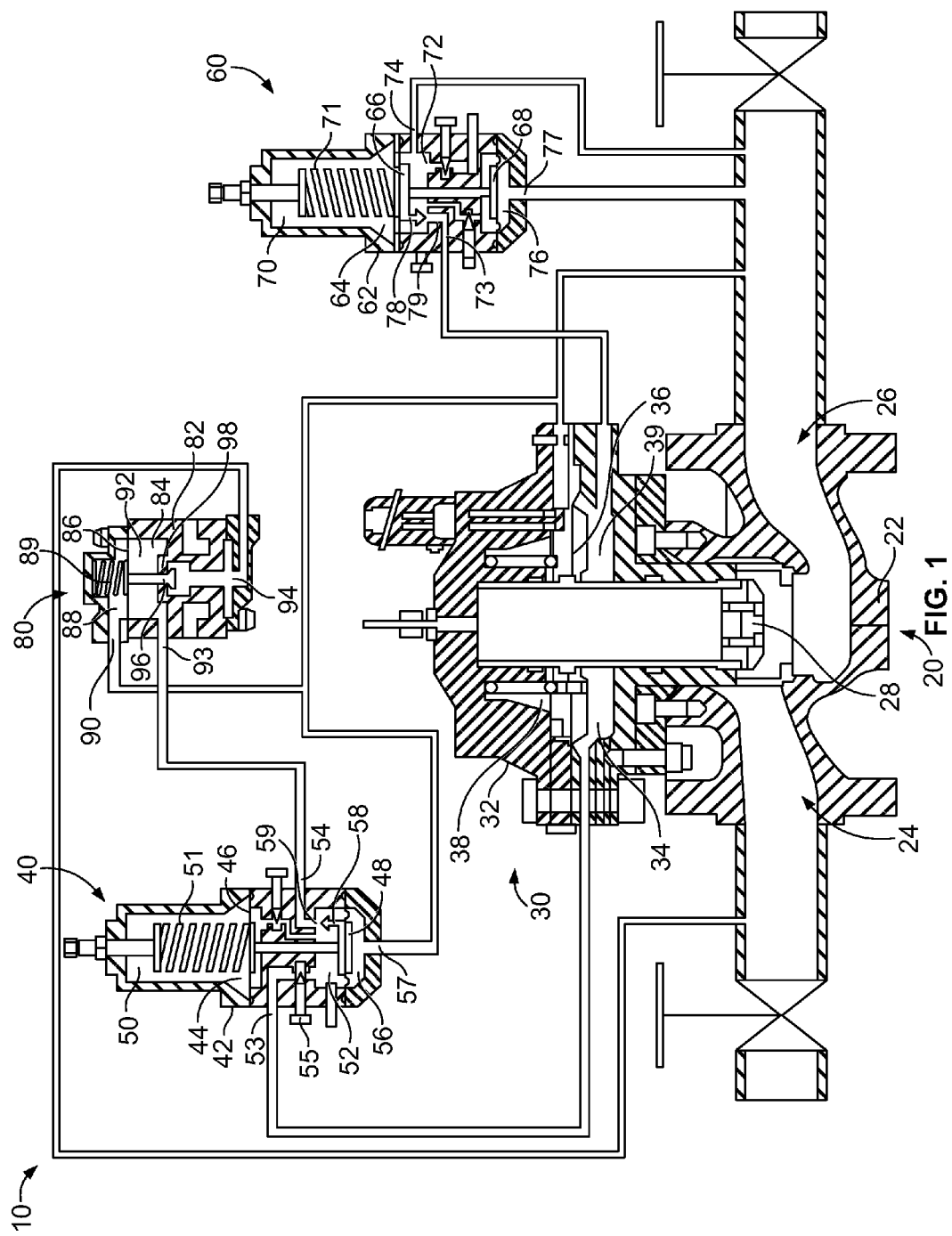
FIG. 1 is a schematic view of an example control system having an adjustable deadband for over pressure protection.

Referring to FIG. 1, one example of a control system 10 provides over pressure protection at the outlet of the pressure regulator and provides for automatic reset of the pressure regulator. Control system 10 generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator. In the example shown in FIG. 1, pressure regulator 20 has a body 22 and an actuator assembly 30. Body 22 defines fluid inlet 24, fluid outlet 26, and valve seat 25 between fluid inlet 24 and fluid outlet 26. Valve plug 28 is movable within body 22 between an open position, where valve plug 28 is spaced from valve seat 25 and a process fluid is allowed to flow through pressure regulator 20 from fluid inlet 24 to fluid outlet 26, and a closed position, where valve plug 28 sealing engages valve seat 25 and the process fluid is prevented from flowing through pressure regulator 20. Actuator assembly 30 includes housing 32, which defines cavity 34, and diaphragm assembly 36 disposed within cavity 34 to divide cavity 34 into first chamber 38 and second chamber 39. Diaphragm assembly 36 is operatively connected to valve plug 28 such that valve plug 28 moves with diaphragm assembly 36 to move valve plug 28 into and out of sealing engagement with valve seat 25.

First pilot 40 is a standard spring to open pilot, such as a Tartarini® PRX 120 Pilot. In the example shown in FIG. 1, first pilot 40 includes housing 42, which defines cavity 44. First and second diaphragm assemblies 46, 48 are disposed in cavity 44 to divide cavity 44 into first chamber 50, second chamber 52, and third chamber 56. Biasing member 51, such as a compression spring, is positioned in first chamber 50 to bias first pilot 40 into an open position. First port 53 is formed in housing 42 and is in fluid communication with second chamber 52 and with second chamber 39 of actuator assembly 30 of pressure regulator 20. Second port 54 is formed in housing 42 and is also in fluid communication with second chamber 52 and with pressure stabilizer 80. Third port 57 is formed in housing 42 and is in fluid communication with third chamber 56 and with fluid outlet 26 of pressure regulator 20. Second diaphragm assembly 48 also includes a plug 58 that moves with second diaphragm assembly 48. Plug 58 is movable between an open position, in which plug 58 is spaced apart from seat 59 and fluid is allowed to flow through second port 54, and a closed position, in which plug 58 is sealing engages with seat 59 and fluid is prevented from flowing through second port 54.

Second pilot 60 is a standard spring to close pilot, such as a Tartarini® PRX 131 Pilot. In the example shown in FIG. 1, second pilot 60 includes housing 62, which defines cavity 64. First and second diaphragm assemblies 66, 68 are disposed in cavity 64 to divide cavity 64 into first chamber 70, second chamber 72, and third chamber 76. Biasing member 71, such as a compression spring, is positioned in first chamber 70 to bias second pilot 60 into a closed position. First port 73 is formed in housing 62 and is in fluid communication with second chamber 72 and with second chamber 39 of actuator assembly 30 of pressure regulator 20. Second port 74 is formed in housing 62 and is also in fluid communication with second chamber 72 and with fluid outlet 26 of pressure regulator 20. Third port 77 is formed in housing 62 and is in fluid communication with third chamber 76 and with fluid outlet 26 of pressure regulator 20. First diaphragm assembly 66 also includes plug 78 that moves with first diaphragm assembly 66. Plug 78 is movable between an open position, in which plug 78 is spaced apart from seat 79 and fluid is allowed to flow through second port 74, and a closed position, in which plug 78 sealing engages seat 79 and fluid is prevented from flowing through second port 74.

Pressure stabilizer 80 is a standard pressure stabilizer, such as a Tartarini® Type SA/2 Pressure Stabilizer. Alternatively, an additional pilot could be used in place of pressure stabilizer 80 or pressure stabilizer 80 could be removed and second port 54 of first pilot 40 could be connected directly to fluid inlet 24 or to another pressurized fluid source. In the example shown in FIG. 1, pressure stabilizer 80 includes housing 82, which defines cavity 84. Diaphragm assembly 86 is disposed in cavity 84 to divide cavity 84 into first chamber 88 and second chamber 92. Biasing member 89, such as a compression spring, is positioned in first chamber 88 to bias pressure stabilizer 80 into an open position. First port 90 is formed in housing 82 and is in fluid communication with first chamber 88 and with fluid outlet 26 of pressure regulator 20. Second port 93 is formed in housing 82 and is in fluid communication with second chamber 92 and with second chamber 52 of first pilot 40, through second port 54. Third port 94 is formed in housing 82 and is in fluid communication with second chamber 92 through seat 98, when plug 96 is spaced apart from seat 98, and with fluid inlet 24 of pressure regulator 20 or with another pressurized fluid source. Diaphragm assembly 86 is operatively connected to plug 96, which moves with diaphragm assembly 86. Plug 96 is movable between an open position, in which plug 96 is spaced apart from seat 98 and fluid is allowed to flow through third port 94, and a closed position, in which plug 96 sealing engages seat 98 and fluid is prevented from flowing through third port 94. In the example shown, pressure stabilizer 80 delivers a pilot supply pressure to first pilot 40.

In operation, first pilot 40 could be set to a first setpoint (e.g., 60 psig), which could be the pressure at which pressure regulator 20 would reset and move from a closed to an open position. In addition, second pilot 60 could be set to a second setpoint (e.g., 70 psig), typically higher than the first setpoint, which could be the pressure at which pressure regulator 20 would move from the open to the closed position. In this example, the dead band for control system 10 is set by setting the setpoint for first pilot 40 below the setpoint for second pilot 60.

During normal operations, the pressure of the process fluid at the fluid outlet 26 of pressure regulator 20 would be below both the first and second setpoints. When the fluid pressure at outlet 26 is below both the first and second setpoints, first pilot 40 is in the open position, second pilot 60 is in the closed position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 increases and becomes greater than the first setpoint (but still less than the second setpoint), first pilot 40 will move from the open position to the closed position, trapping pressure in second chamber 39 of actuator assembly 30 between second pilot 60 and first pilot 40. In the closed position, second diaphragm assembly 48 will move plug 58 into sealing engagement with seat 59 and prevent the flow of pressurized fluid from pressure stabilizer 80 into second chamber 52 of first pilot 40. Pressure regulator 20 will still be in the open position.

As the pressure of the process fluid at fluid outlet 26 continues to increase and becomes greater than the second setpoint, second pilot 60 will move from closed to open positions. In the open position of second pilot 60, second pilot 60 dumps the trapped pressure to a downstream location, causing pressure regulator 20 to close. First diaphragm assembly 66 of second pilot 60 will move plug 78 away from seat 79 and allow the flow of pressurized fluid from second chamber 39 of actuator assembly 30, through second chamber 72 of second pilot 60, and out second port 74 into fluid outlet 26, or otherwise into the downstream flow of the process fluid. The drop in pressure in second chamber 39 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

With pressure regulator 20 in the closed position, the pressure at fluid outlet 26 will decrease. As the pressure of the process fluid at fluid outlet 26 decreases and drops below the second setpoint of second pilot 60 (but still above the first setpoint of first pilot 40), second pilot 60 will move from the open to the closed position, which prevents the flow of fluid from second chamber 39 of actuator assembly 30 to fluid outlet 26 or otherwise downstream from fluid outlet 26. Pressure regulator 20 remains in the closed position.

As the pressure of the process fluid at fluid outlet 25 continues to decrease and drops below the first setpoint of first pilot 40, first pilot 40 will move from the closed to the open position. As first pilot 40 moves back to the open position, second diaphragm assembly 48 will move plug 58 away from seat 59 and allow the flow of pressurized fluid from pressure stabilizer 80 into second chamber 52, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. First pilot 40 can also include restrictor 55 to adjust the filling speed of second chamber 39 to any desired speed.

Figure 2:
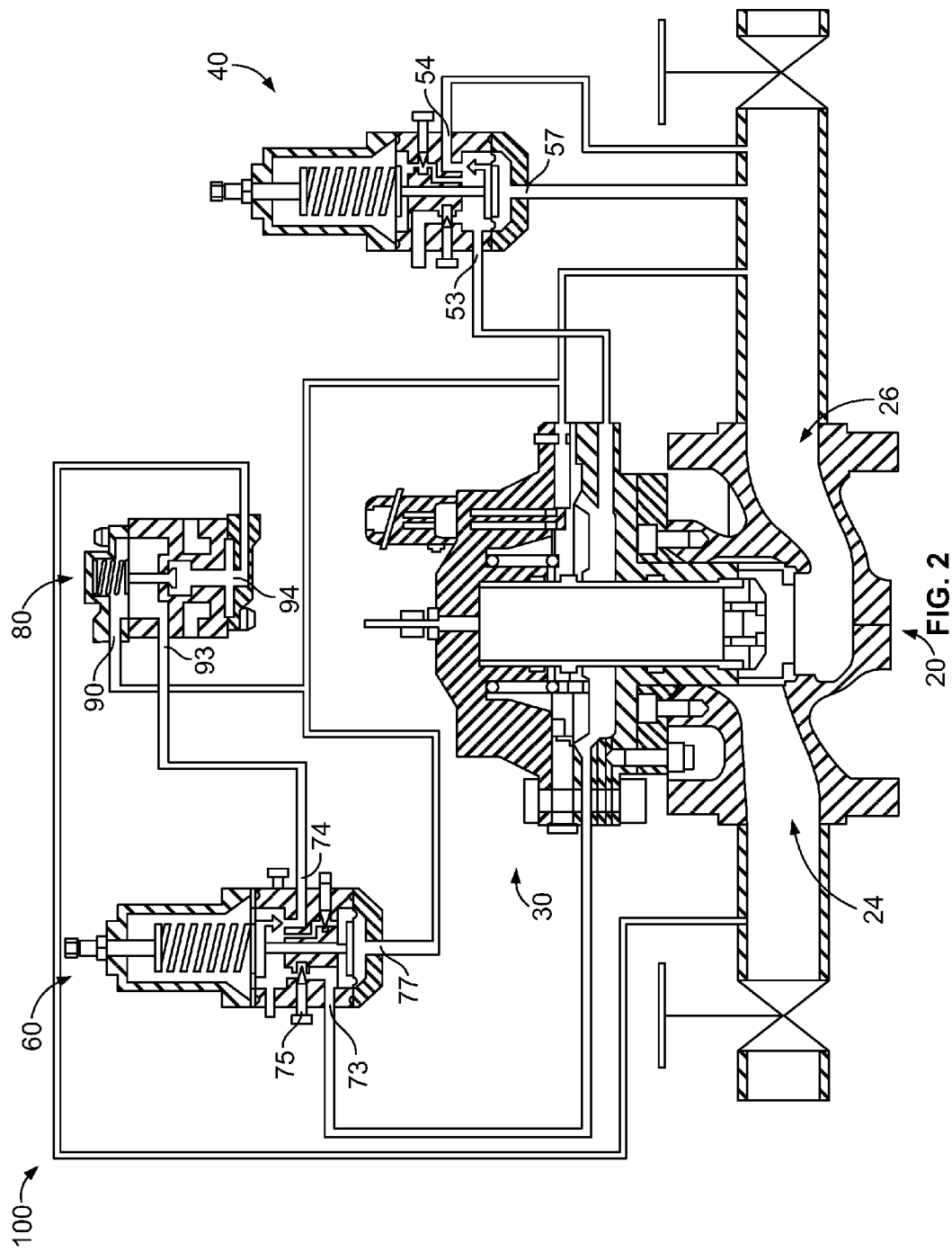
FIG. 2 is a schematic view of an example control system having an adjustable deadband for under pressure protection.

Referring to FIG. 2, another example of a control system 100 provides under pressure protection at the outlet of the pressure regulator and provides for automatic reset of the pressure regulator. Control system 100 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 2, first port 53 of first pilot 40 is in fluid communication with second chamber 39 of actuator assembly 30 of pressure regulator and second port 54 and third port 57 are in fluid communication with fluid outlet 26 of pressure regulator 20.

Second pilot 60 is a standard spring to close pilot, such as a Tartarini® PRX 131 Pilot, as described above. However, in the example shown in FIG. 2, first port 73 is in fluid communication with second chamber 39 of actuator assembly 30 of pressure regulator 20, second port 74 is in fluid communication with pressure stabilizer 80, and third port 77 is in fluid communication with fluid outlet 26 of pressure regulator 20.

Pressure stabilizer 80 is a standard pressure stabilizer, such as a Tartarini® Type SA/2 Pressure Stabilizer, as described above. However, in the example shown in FIG. 2, first port 90 is in fluid communication with fluid outlet 26 of pressure regulator 20, second port 93 is in fluid communication with second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 54 of first pilot 40 could be connected directly to fluid inlet 24 or to another pressurized fluid source. In the example shown, pressure stabilizer delivers a pilot supply pressure to second pilot 60.

In operation, first pilot 40 could be set to a first setpoint (e.g., 30 psig), which could be the pressure at which pressure regulator 20 would move from the open to the closed position. In addition, second pilot 60 could be set to a second setpoint (e.g., 40 psig), typically higher than the first setpoint, which could be the pressure at which pressure regulator 20 would reset and move from a closed to an open position. In this example, the deadband for control system 10 is set by setting the setpoint for first pilot 40 below the setpoint for second pilot 60.

During normal operations, the pressure of the process fluid at the fluid outlet 26 of pressure regulator 20 would be above both the first and second setpoints. When the fluid pressure at outlet 26 is above both the first and second setpoints, first pilot 40 is in the closed position and second pilot 60 is in the open position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 decreases and becomes less than the first setpoint (but still greater than the second setpoint), second pilot 60 will move from the open position to the closed position, trapping pressure in second chamber 39 of actuator assembly 30 between second pilot 60 and first pilot 40. In the closed position, first diaphragm assembly 66 will move plug 78 into sealing engagement with seat 79 and prevent the flow of pressurized fluid from pressure stabilizer 80 into second chamber 72 of second pilot 60. Pressure regulator 20 will still be in the open position.

As the pressure of the process fluid at fluid outlet 26 continues to decrease and becomes less than the second setpoint, first pilot 40 will move from closed to open positions. In the open position of first pilot 40, first pilot 40 dumps the trapped pressure to a downstream location, causing pressure regulator 20 to close. Second diaphragm assembly 48 of first pilot 40 will move plug 58 away from seat 59 and allow the flow of pressurized fluid from second chamber 39 of actuator assembly 30, through second chamber 52 of first pilot 40, and out second port 54 into fluid outlet 26, or otherwise into the downstream flow of the process fluid. The drop in pressure in second chamber 39 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

As the pressure of the process fluid at fluid outlet 26 increases above the second setpoint of first pilot 40 (but still below the first setpoint of second pilot 60), first pilot 40 will move from the open to the closed position, which prevents the flow of fluid from second chamber 39 of actuator assembly 30 to fluid outlet 26 or otherwise downstream from fluid outlet 26. Pressure regulator 20 remains in the closed position.

As the pressure of the process fluid at fluid outlet 25 continues to increase above the first setpoint of second pilot 60, second pilot 60 will move from the closed to the open position. As second pilot 60 moves back to the open position, first diaphragm assembly 66 will move plug 78 away from seat 79 and allow the flow of pressurized fluid from pressure stabilizer 80 into second chamber 72, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. Second pilot 60 can also include restrictor 75 to adjust the filling speed of second chamber 39 to any desired speed.

A control system having both over and under pressure protection can also be provided by placing first pilot 40 of FIG. 1 in series with second pilot 60 of FIG. 2 and second pilot 60 of FIG. 1 in parallel with first pilot 40 of FIG. 2.

Figure 3:
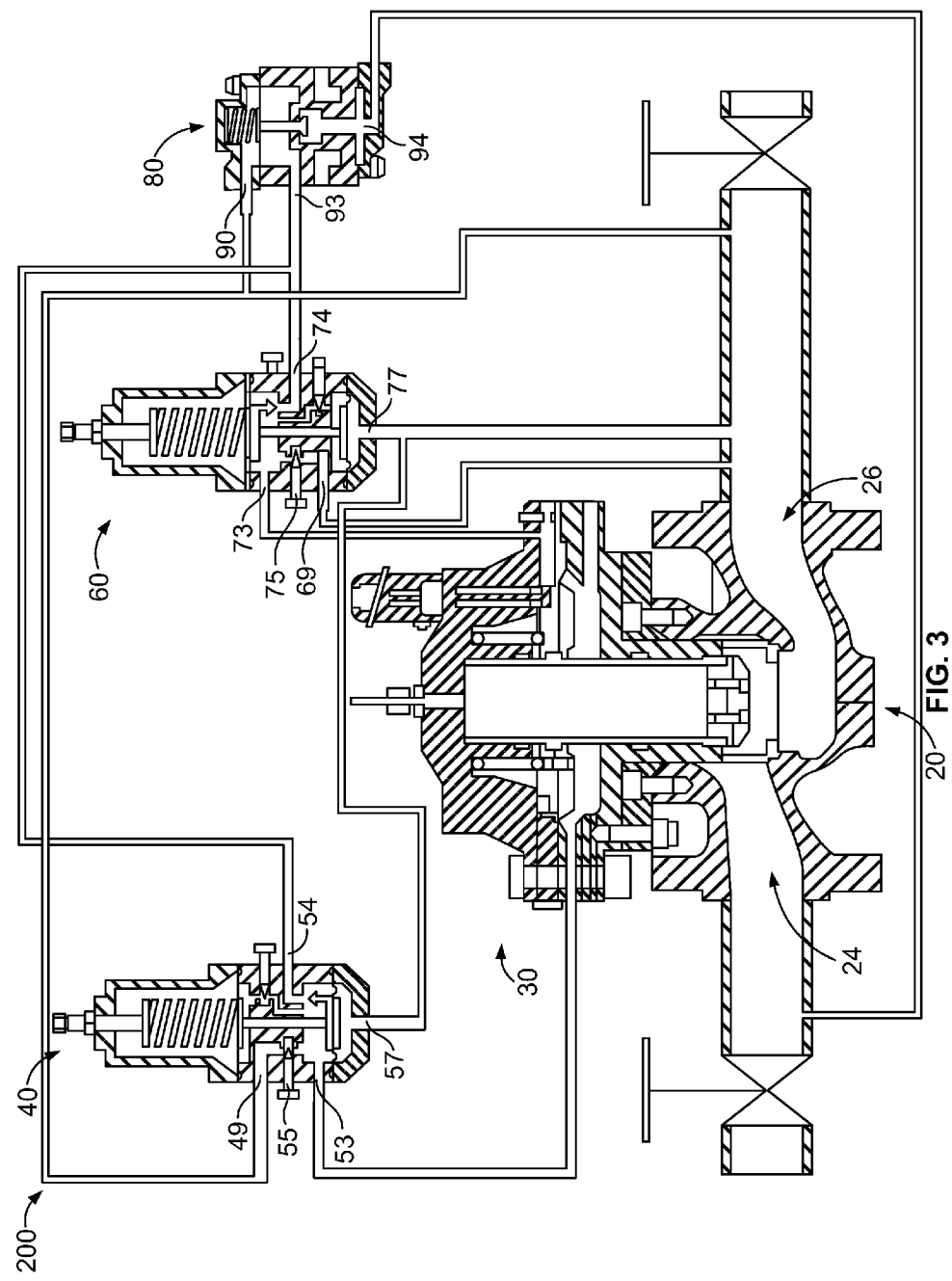
FIG. 3 is a schematic view of an example control system having pressure assisted closure for over pressure protection.

Referring to FIG. 3, another example of a control system 200 provides over pressure protection at the outlet of the pressure regulator, pressure assisted closure of the pressure regulator, and automatic reset of the pressure regulator. Control system 200 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 3, first port 53 of first pilot 40 is in fluid communication with second chamber 39 of actuator assembly 30 of pressure regulator 20, second port 54 is in fluid communication with pressure stabilizer 80, and third port 57 is in fluid communication with fluid outlet 26 of pressure regulator 20. In addition, a fourth port 49 is in fluid communication with second chamber 52 and with fluid outlet 26 and the flow of fluid through fourth port 49 can be controlled with restrictor 55.

Second pilot 60 is a standard spring to close pilot, such as a Tartarini® PRX 131 Pilot, as described above. However, in the example shown in FIG. 3, first port 73 is in fluid communication with first chamber 38 of actuator assembly 30, second port 74 is in fluid communication with pressure stabilizer 80, and third port 77 is in fluid communication with fluid outlet 26 of pressure regulator 20. In addition, a fourth port 69 is in fluid communication with second chamber 72 and with fluid outlet 26 and the flow of fluid through fourth port 69 can be controlled with restrictor 75.

Pressure stabilizer 80 is a standard pressure stabilizer, such as a Tartarini® Type SA/2 Pressure Stabilizer, as described above. However, in the example shown in FIG. 3, first port 90 is in fluid communication with fluid outlet 26 of pressure regulator 20, second port 93 is in fluid communication with both first pilot 40 and second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 54 of first pilot 40 and second port 74 of second pilot 60 could be connected directly to fluid inlet 24 or to another pressurized fluid source. In the example shown, pressure stabilizer 80 delivers a pilot supply pressure to both first pilot 40 and second pilot 60.

In operation, first pilot 40 could be set to a first setpoint, which could be the pressure at which pressure regulator 20 would reset and move from a closed to an open position. In addition, second pilot 60 could be set to a second setpoint, typically higher than the first setpoint, which could be the pressure at which pressure regulator 20 would move from the open to the closed position.

During normal operations, the pressure of the process fluid at the fluid outlet 26 of pressure regulator 20 would be below both the first and second setpoints. When the fluid pressure at outlet 26 is below both the first and second setpoints, first pilot 40 is in the open position and second pilot 60 is in the closed position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 increases and becomes greater than the first setpoint (but still less than the second setpoint), first pilot 40 will move from the open position to the closed position, trapping pressure in second chamber 39 of actuator assembly 30 and cutting off the flow of pressurized fluid from pressure stabilizer 80 to second chamber 39 of actuator assembly 30. In the closed position, second diaphragm assembly 48 will move plug 58 into sealing engagement with seat 59 and prevent the flow of pressurized fluid from pressure stabilizer 80 into second chamber 52 of first pilot 40. Pressure in second chamber 39 can also be reduced by bleeding a portion of the pressurized fluid from second chamber 39 through fourth port 49 in first pilot 40 via restrictor 55. Pressure regulator 20 will still be in the open position.

As the pressure of the process fluid at fluid outlet 26 continues to increase and becomes greater than the second setpoint, second pilot 60 will move from the closed to the open position. In the open position of second pilot 60, second pilot 60 allows pressurized fluid from pressure stabilizer 80 to flow through second chamber 72 and into first chamber 38 of actuator assembly 30, causing pressure regulator 20 to close. First diaphragm assembly 66 of second pilot 60 will move plug 78 away from seat 79 and allow the flow of pressurized fluid from pressure stabilizer 80, through second chamber 72 of second pilot 60, and out first port 73 into first chamber 38. The increase in pressure in first chamber 38 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

With pressure regulator 20 in the closed position, the pressure at fluid outlet 26 will decrease. As the pressure of the process fluid at fluid outlet 26 decreases and drops below the second setpoint of second pilot 60 (but still above the first setpoint of first pilot 40), second pilot 60 will move from the open to the closed position, which prevents the flow of fluid from pressure stabilizer 80 to first chamber 38 of actuator assembly 30. Pressure regulator 20 remains in the closed position.

As the pressure of the process fluid at fluid outlet 26 continues to decrease and drops below the first setpoint of first pilot 40, first pilot 40 will move from the closed to the open position. As first pilot 40 moves back to the open position, second diaphragm assembly 48 will move plug 58 away from seat 59 and allow the flow of pressurized fluid from pressure stabilizer 80 into second chamber 52, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. Pressure in first chamber 38 can also be reduced by bleeding a portion of the pressurized fluid from first chamber 38 through fourth port 69 in second pilot 60 via restrictor 75. Second pilot 60 is constantly bleeding loading pressure to fluid outlet 26 or to another downstream location, but very slowly.

Figure 4:
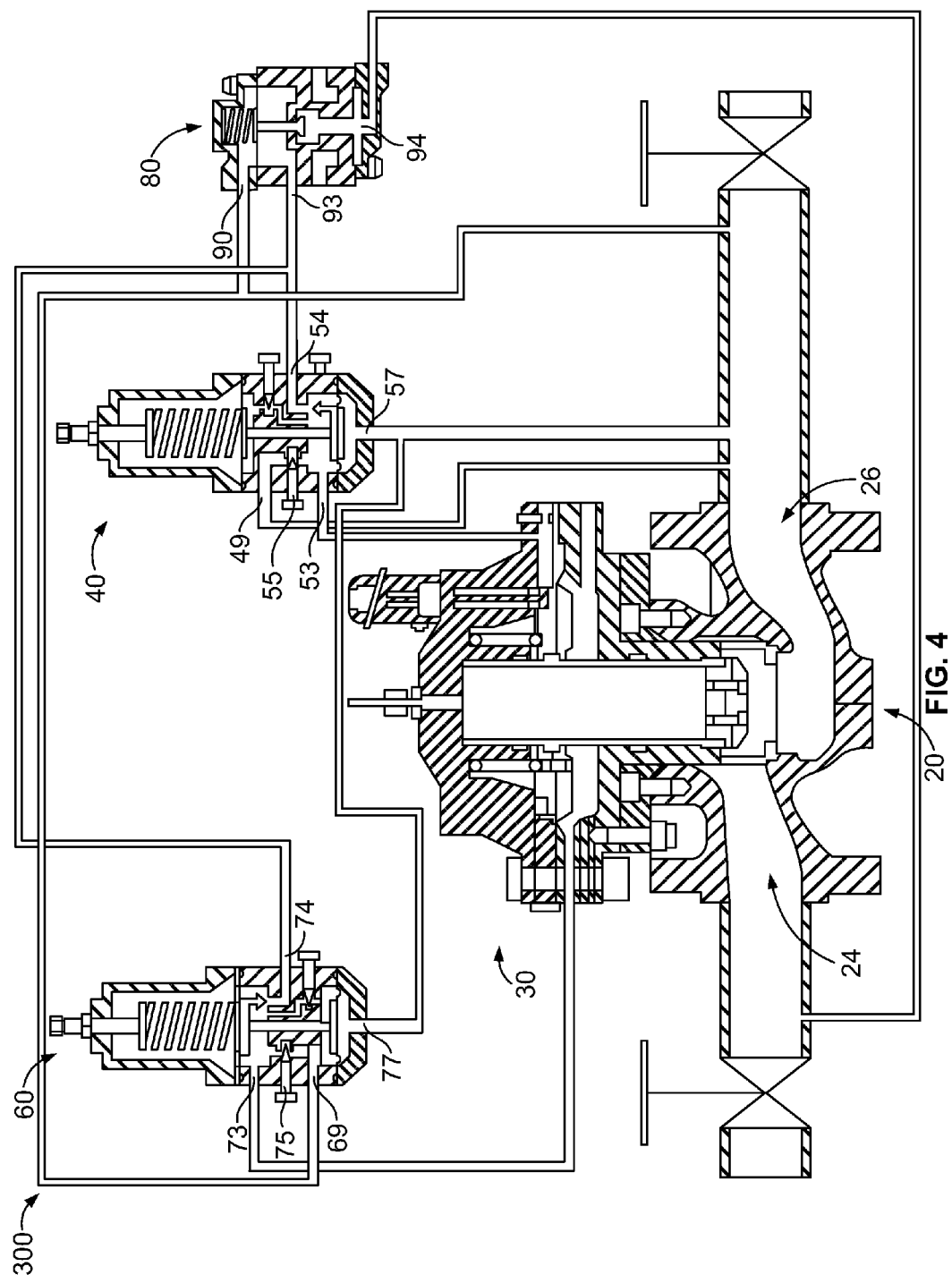
FIG. 4 is a schematic view of an example control system having pressure assisted closure for under pressure protection.

Referring to FIG. 4, another example of a control system 300 provides under pressure protection at the outlet of the pressure regulator, pressure assisted closure of the pressure regulator, and automatic reset of the pressure regulator. Control system 300 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 4, first port 53 of first pilot 40 is in fluid communication with first chamber 38 of actuator assembly 30, second port 54 is in fluid communication with pressure stabilizer 80, and third port 57 is in fluid communication with fluid outlet 26 of pressure regulator 20. In addition, a fourth port 49 is in fluid communication with fluid outlet 26 and the flow of fluid through fourth port 49 can be controlled with restrictor 55.

Second pilot 60 is a standard spring to close pilot, such as a Tartarini® PRX 131 Pilot, as described above. However, in the example shown in FIG. 4, first port 73 is in fluid communication with second chamber 39 of actuator assembly 30, second port 74 is in fluid communication with pressure stabilizer 80, and third port 77 is in fluid communication with fluid outlet 26 of pressure regulator 20. In addition, a fourth port 69 is in fluid communication with fluid outlet 26 and the flow of fluid through fourth port 69 can be controlled with restrictor 75.

Pressure stabilizer 80 is a standard pressure stabilizer, such as a Tartarini® Type SA/2 Pressure Stabilizer, as described above. However, in the example shown in FIG. 4, first port 90 is in fluid communication with fluid outlet 26 of pressure regulator 20, second port 93 is in fluid communication with both first pilot 40 and second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 54 of first pilot 40 and second port 74 of second pilot 60 could be connected directly to fluid inlet 24 or to another pressurized fluid source. In the example shown, pressure stabilizer 80 delivers a pilot supply pressure to both first pilot 40 and second pilot 60.

In operation, first pilot 40 could be set to a first setpoint, which could be the pressure at which pressure regulator 20 would move from the open to the closed position. In addition, second pilot 60 could be set to a second setpoint, typically higher than the first setpoint, which could be the pressure at which pressure regulator 20 would reset and move from a closed to an open position.

During normal operations, the pressure of the process fluid at the fluid outlet 26 of pressure regulator 20 would be above both the first and second setpoints. When the fluid pressure at outlet 26 is above both the first and second setpoints, first pilot 40 is in the closed position and second pilot 60 is in the open position. Therefore, the pressure in second chamber 39 of pressure regulator 20 is held constant, the forces acting on diaphragm assembly are equalized, valve plug 28 is spaced apart from valve seat 25, and pressure regulator 20 remains in the open position.

As the pressure of the process fluid at fluid outlet 26 decreases and becomes less than the second setpoint (but still greater than the first setpoint), second pilot 60 will move from the open position to the closed position, trapping pressure in second chamber 39 of actuator assembly 30 and cutting off the flow of pressurized fluid from pressure stabilizer 80 to second chamber 39 of actuator assembly 30. In the closed position, first diaphragm assembly 66 will move plug 78 into sealing engagement with seat 79 and prevent the flow of pressurized fluid from pressure stabilizer 80 into second chamber 72 of second pilot 60. Pressure in second chamber 39 can also be reduced by bleeding a portion of the pressurized fluid from second chamber 39 through fourth port 69 in second pilot 60 via restrictor 75. Pressure regulator 20 will still be in the open position.

As the pressure of the process fluid at fluid outlet 26 continues to decrease and becomes less than the first setpoint, first pilot 40 will move from the closed to the open position. In the open position of first pilot 40, first pilot 40 allows pressurized fluid from pressure stabilizer 80 to flow through second chamber 52 and into first chamber 38 of actuator assembly 30, causing pressure regulator 20 to close. Second diaphragm assembly 48 of first pilot 40 will move plug 58 away from seat 59 and allow the flow of pressurized fluid from pressure stabilizer 80, through second chamber 52 of first pilot 40, and out first port 53 into first chamber 38. The increase in pressure in first chamber 38 will create an imbalance in the forces acting on diaphragm assembly 36, which moves valve plug 28 into sealing engagement with valve seat 25, placing pressure regulator 20 in the closed position and preventing the flow of the process fluid through pressure regulator 20.

As the pressure of the process fluid at fluid outlet 26 increases above the first setpoint of first pilot 40 (but still below the second setpoint of second pilot 60), first pilot 40 will move from the open to the closed position, which prevents the flow of fluid from pressure stabilizer 80 to first chamber 38 of actuator assembly 30. Pressure regulator 20 remains in the closed position.

As the pressure of the process fluid at fluid outlet 26 continues to increase above the second setpoint of second pilot 60, second pilot 60 will move from the closed to the open position. As second pilot 60 moves back to the open position, first diaphragm assembly 66 will move plug 78 away from seat 79 and allow the flow of pressurized fluid from pressure stabilizer 80 into second chamber 72, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position. Pressure in first chamber 38 can also be reduced by bleeding a portion of the pressurized fluid from first chamber 38 through fourth port 49 in first pilot 40 via restrictor 55. First pilot 40 is constantly bleeding loading pressure to fluid outlet 26 or to another downstream location, but very slowly.

A control system having pressure assisted closure and both over and under pressure protection can also be provided by placing first pilot 40 of FIG. 3 in series with second pilot 60 of FIG. 4 and second pilot 60 of FIG. 3 in parallel with first pilot 40 of FIG. 4.

Figure 5:
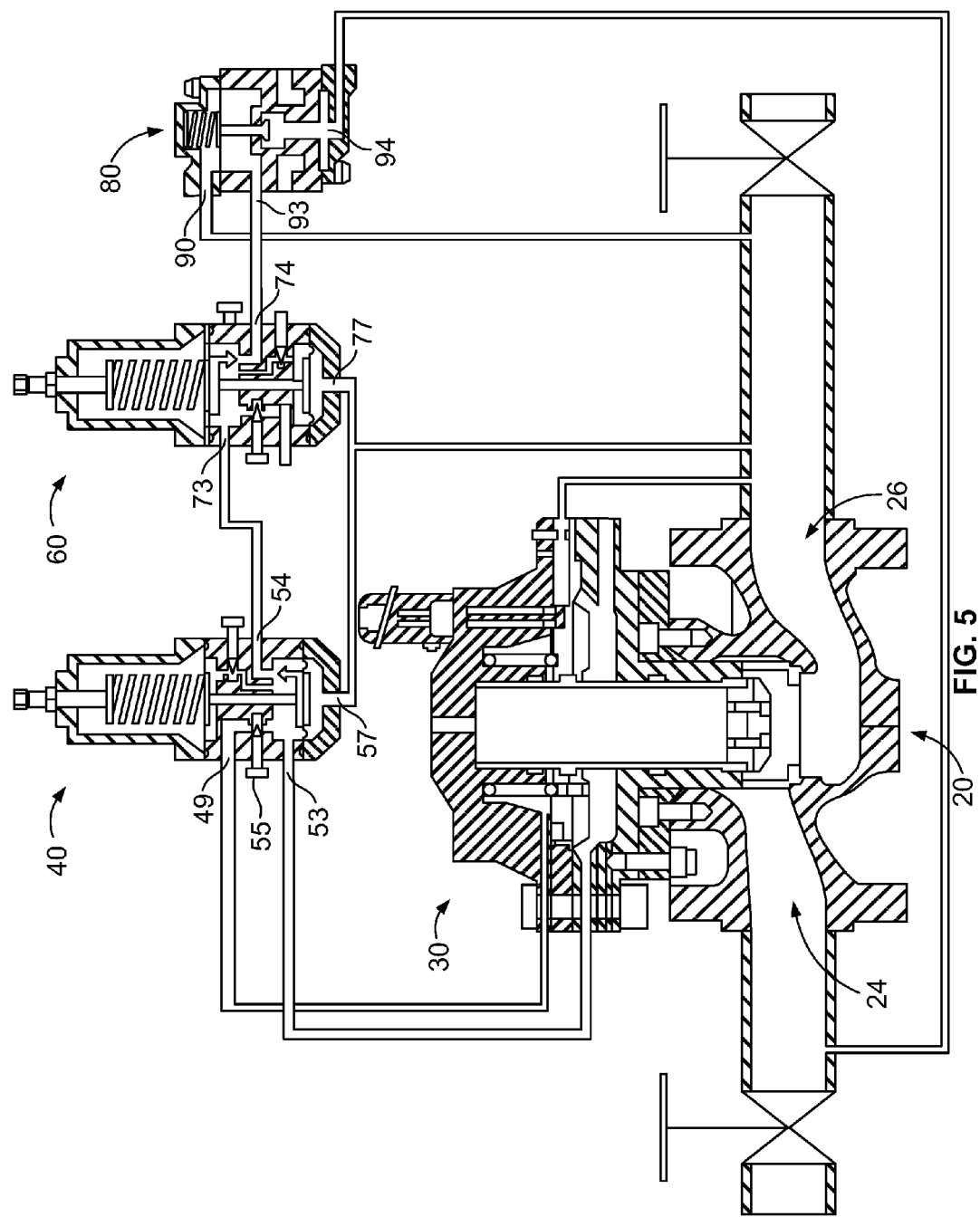
FIG. 5 is a schematic view of an example control system having spring assisted closure for over and under pressure protection.

Referring to FIG. 5, one example of a control system 400 provides over and under pressure protection at the outlet of the pressure regulator and provides for automatic reset of the pressure regulator. Control system 400 also generally includes a pressure regulator 20, a first pilot 40, a second pilot 60, and a pressure stabilizer 80.

Pressure regulator 20 is a standard pressure regulator, such as a Fisher® EZH Series Pressure Reducing Regulator, as described above.

First pilot 40 is a standard spring to open pilot, such as a Tartarini® PRX 120 Pilot, as described above. However, in the example shown in FIG. 5, first port 53 of first pilot 40 is in fluid communication with second chamber 39 of actuator assembly 30, second port 54 is in fluid communication with second pilot 60, and third port 57 is in fluid communication with fluid outlet 26 of pressure regulator 20. In addition, a fourth port 49 is in fluid communication with first chamber 38 of actuator assembly 30 and the flow of fluid through fourth port 49 can be controlled with restrictor 55. In this example, first pilot 40 is the over pressure shut off pilot.

Second pilot 60 is a standard spring to close pilot, such as a Tartarini® PRX 131 Pilot, as described above. However, in the example shown in FIG. 5, first port 73 is in fluid communication with first pilot 40, second port 74 is in fluid communication with pressure stabilizer 80, and third port 77 is in fluid communication with fluid outlet 26 of pressure regulator 20. In this example, second pilot 60 is the under pressure shut off pilot.

Pressure stabilizer 80 is a standard pressure stabilizer, such as a Tartarini® Type SA/2 Pressure Stabilizer, as described above. However, in the example shown in FIG. 5, first port 90 is in fluid communication with fluid outlet 26 of pressure regulator 20, second port 93 is in fluid communication with second pilot 60, and third port 94 is in fluid communication with fluid inlet 24 of pressure regulator 20 or with another pressurized fluid source when plug 96 is spaced apart from seat 98. Alternatively, an additional pilot could be used in place of pressure stabilizer 80 or pressure stabilizer 80 could be removed and second port 74 of second pilot 60 could be connected directly to fluid inlet 24 or to another pressurized fluid source. In the example shown, pressure stabilizer 80 delivers a pilot supply pressure to hold pressure regulator 20 in the open position.

In operation, first pilot 40 could be set to a first setpoint, which could be the over pressure protection point. In addition, second pilot 60 could be set to a second setpoint, lower than the first setpoint, which could be the under pressure protection point.

During normal operations, the pressure of the process fluid at the fluid outlet 26 of pressure regulator 20 would be between the first and second setpoints. When the fluid pressure at outlet 26 is between the first and second setpoints, first pilot 40 and second pilot 60 are in the open position. With first pilot 40 and second pilot 60 in the open position, the fluid from pressure from pressure stabilizer 80 flows through first pilot 40 and second pilot 60 and to second chamber 39 of actuator assembly 30. In this state, the force generated on diaphragm assembly 36 by the pressure in second chamber 39 is greater than the force generated on diaphragm assembly 36 by biasing member 35, such as a spring. Therefore, pressure regulator 20 remains in the open position.

If the pressure of the process fluid at fluid outlet 26 increases and becomes greater than the first setpoint, first pilot 40 will move from the open position to the closed position, preventing pressurized fluid from pressure stabilizer 80 from being supplied to second chamber 39. In the closed position, second diaphragm assembly 48 will move plug 58 into sealing engagement with seat 59 and prevent the flow of pressurized fluid from pressure stabilizer 80 into second chamber 52 of first pilot 40. The pressure from second chamber 39 will bleed downstream through fourth port 49 in first pilot 40. The drop in pressure in second chamber 39 will create an imbalance in the forces acting on diaphragm assembly 36, and biasing member 35 moves valve plug 28 into sealing engagement with valve seat 25, placing pressure regulator 20 in the closed position and preventing the flow of the process fluid through pressure regulator 20. Second pilot 60 remains in the open position since the pressure of the process fluid at fluid outlet 26 is still above the second setpoint.

With pressure regulator 20 in the closed position, the pressure at fluid outlet 26 will decrease. As the pressure of the process fluid at fluid outlet 26 decreases and drops below the first setpoint of first pilot 40, first pilot 40 will move from the closed to the open position. As first pilot 40 moves back to the open position, second diaphragm assembly 48 will move plug 58 away from seat 59 and allow the flow of pressurized fluid from pressure stabilizer 80 into second chamber 52, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position.

On the contrary, if the pressure of the process fluid at fluid outlet 25 decreases and becomes less than the second setpoint, second pilot 60 will move from the open position to the closed position, preventing pressurized fluid from pressure stabilizer 80 from being supplied to second chamber 39. In the closed position, first diaphragm assembly 66 will move plug 78 into sealing engagement with seat 79 and prevent the flow of pressurized fluid from pressure stabilizer 80 into second chamber 72 of second pilot 60. The pressure from second chamber 39 will bleed downstream through fourth port 49 in first pilot 40. The drop in pressure in second chamber 39 will create an imbalance in the forces acting on diaphragm assembly 36, and biasing member 35 moves valve plug 28 into sealing engagement with valve seat 25, placing pressure regulator 20 in the closed position and preventing the flow of the process fluid through pressure regulator 20. First pilot 40 remains in the open position since the pressure of the process fluid at fluid outlet 26 is still below the first setpoint.

As the pressure of the process fluid at fluid outlet 26 increases and rises above the second setpoint of second pilot 60, second pilot 60 will move from the closed to the open position. As second pilot 60 moves back to the open position, first diaphragm assembly 66 will move plug 78 away from seat 79 and allow the flow of pressurized fluid from pressure stabilizer 80 into second chamber 72, which will re-pressurize second chamber 39 of actuator assembly 30. As the pressure in second chamber 39 increases, diaphragm assembly 36 will move valve plug 28 away from valve seat 25 and to the open position and automatically reset pressure regulator 20. As the forces acting on both sides of diaphragm assembly 36 rebalance, pressure regulator 20 will remain in the open position.

If over pressure or under pressure is required only, then either first pilot 40 or second pilot 60 could be removed to provide a self-resetting control system having only over pressure protection or only under pressure protection.

Control systems 10, 100, 200, 300, 400 provide much improved methods of achieving auto reset slamshut or adjustable deadband over using shuttle valves or switch valves, which are not fully rated to inlet pressure. Using the systems described above, normal pressure reducing and pressure relief pilots can be used that are rated to the full inlet of the pressure regulator. This full rating increases the overall safety of the control system while still allowing the proper adjustable maximum and minimum setpoints.

In addition, control systems 10, 100, 200, 300, 400 could also be provided with sensors or electronic monitoring systems to allow remote status update of control systems 10, 100, 200, 300, 400. In addition, although control systems 10, 100, 200, 300, 400 have been shown as a combination of separate pressure regulators, pilots, and pressure stabilizers, the entire control system could be merged into a single body instead of separate elements. Furthermore, although control systems 10, 100, 200, 300, 400 could also be adapted for use with rotary actuators by use of a pressure or electronic signal.

While various embodiments have been described above, this disclosure is not intended to be limited thereto. Variations can be made to the disclosed embodiments that are still within the scope of the appended claims.

What is claimed is:

1. A control system, comprising:
    a pressure regulator comprising a fluid inlet, a fluid outlet, and an actuator assembly, the actuator assembly comprising a cavity and a diaphragm assembly disposed within the cavity and dividing the cavity into a first chamber and a second chamber, the first chamber in fluid communication with the fluid outlet;
    a first pilot in fluid communication with the second chamber of the actuator assembly and the fluid outlet;
    a second pilot in fluid communication with the second chamber of the actuator assembly and the fluid outlet; and
    a pressure stabilizer in fluid communication with the fluid inlet, the fluid outlet, and the first pilot, wherein:
    the first pilot is in an open position and the second pilot is in a closed position with a pressure of a process fluid at the fluid outlet below a first setpoint of the first pilot and below a second setpoint of the second pilot;
    the first pilot is in a closed position and the second pilot is in the closed position with the pressure of the process fluid at the outlet above the first setpoint and below the second setpoint; and
    the first pilot is in a closed position and the second pilot is in an open position with the pressure of the process fluid at the fluid outlet above the first setpoint and above the second setpoint.

2. The control system of claim 1, wherein:
    the first pilot comprises a cavity, a first diaphragm assembly disposed within the cavity, and a second diaphragm assembly disposed within the cavity, the first and second diaphragm assemblies dividing the cavity into a first chamber, a second chamber, and a third chamber;
    the actuator assembly is in fluid communication with the second chamber of the first pilot;
    the pressure stabilizer is in fluid communication with the second chamber of the first pilot with a plug of the first pilot spaced apart from a seat of the first pilot; and
    the third chamber of the first pilot is in fluid communication with the fluid outlet.

3. The control system of claim 1, wherein:
    the second pilot comprises a cavity, a first diaphragm assembly disposed within the cavity, and a second diaphragm assembly disposed within the cavity, the first and second diaphragm assemblies dividing the cavity into a first chamber, a second chamber, and a third chamber;

the actuator assembly is in fluid communication with the second chamber of the second pilot with a plug of the second pilot spaced apart from a seat of the second pilot;

the second chamber of the second pilot is in fluid communication with the fluid outlet; and the third chamber of the second pilot is in fluid communication with the fluid outlet.

4. The control system of claim 1, wherein:

the pressure stabilizer comprises a cavity and a diaphragm assembly disposed within the cavity, the diaphragm assembly dividing the cavity into a first chamber and a second chamber;

the first pilot is in fluid communication with the second chamber of the pressure stabilizer;

the first chamber of the pressure stabilizer is in fluid communication with the fluid outlet; and the second chamber of the pressure stabilizer is in fluid communication with the fluid inlet with a plug of the pressure stabilizer spaced apart from a seat of the pressure stabilizer.

* * * * *